Figure 1:
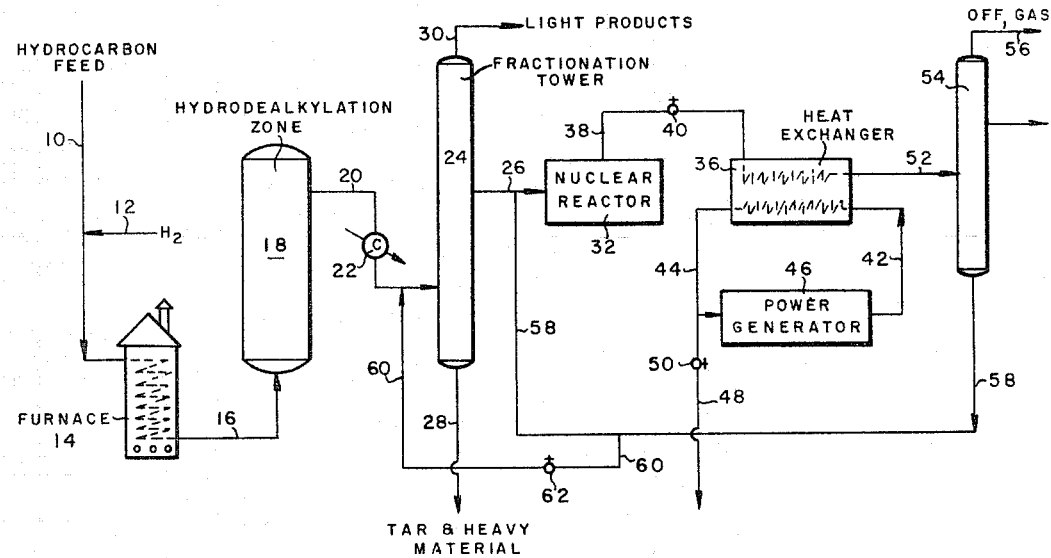

Feb. 14, 1967   E. A. KELSO   3,304,233
METHOD OF COOLING A NUCLEAR REACTOR
Filed Oct. 3, 1963

INVENTOR.
EDWARD A. KELSO,
BY Frank S. Troidl
ATTORNEY.

United States Patent Office 3,304,233
Patented Feb. 14, 1967

---

3,304,233
METHOD OF COOLING A NUCLEAR REACTOR
Edward A. Kelso, Baytown, Tex., assignor, by mesne assignments, to Esso Research and Engineering Company, Elizabeth, N.J., a corporation of Delaware
Filed Oct. 3, 1963, Ser. No. 313,462
6 Claims. (Cl. 176—39)

This invention relates to the conservation of the thermal energy derived from nuclear reactions. More particularly, the present invention is directed to an improved coolant for a nuclear reactor for use in the conservation of thermal energy derived from nuclear reactions.

A substantial portion of the energy generated in a nuclear reactor is thermal energy. It is desirable to conserve such thermal energy. This is accomplished in accordance with the present invention by providing a stream of a flowing organic liquid (as hereinafter defined) for cooling the nuclear reactor or for both cooling the reactor and moderating the nuclear reaction. The thermal energy imparted to the coolant may then be utilized exterior to the nuclear reactor in any desired manner such as, for example, to provide a heating medium for power generation.

The coolant of the present invention is a hydrocarbon fraction boiling within the range of about 650° F. to 1200° F. at atmospheric pressure. The coolant is obtained by the noncatalytic thermal hydrodealkylation of a particular feedstock. The feedstock can be light catalytic cycle stock or heavy catalytic cycle stock from catalytic cracking or aromatic concentrates produced by extraction of the above materials. The feedstocks can also be desulfurized to produce a low sulfur product.

The thermal hydrodealkylated material may be fractionated to produce as one of its components a hydrocarbon fraction boiling within the range of about 650° F. to 1200° F. at atmospheric pressure.

The coolant should be flowed through the nuclear reactor under conditions such that not more than about 5 percent of the coolant is converted.

In general, the upper temperature limit for the coolant will be determined by the susceptibility of the coolant to thermal decomposition. With reference to thermal conversion, it is to be observed that the extent of thermal conversion is dependent on time as well as temperature. The coolant should not be heated above the temperature of incipient thermal decomposition for periods of time sufficient to permit more than a minor amount, say 5 volume percent, of thermal conversion.

The pressure to be imposed on the coolant at the point of introduction of the coolant into the nuclear reactor should be at least sufficient to provide for a rate of coolant flow sufficient to prevent excess heating and/or excess irradiation of the coolant. Normally, a pressure of about 50 p.s.i.g. or less will be sufficient. Pressures of up to about 200 p.s.i.g. may be employed with satisfactory results; and, if desired, still higher pressures may be employed.

As a consequence of the present invention, numerous advantages are obtained. Thus, it is possible to operate nuclear reactors cooled with organic coolants at temperatures which are substantially higher than those now considered practical in nuclear technology. The coolants are substantially noncorrosive in nature; and, as a consequence, corrosion does not present a serious problem. Also, excessively high pressures are not required whereby the nuclear reactor may be of lighter and simpler construction. Furthermore, exposure of the coolant to nuclear radiation within the nuclear reactor does not render the coolant radioactive to more than a slight extent so that the use of shielding for the coolant exterior to the nuclear reactor is not necessary. Still further, there is only a minimum impairment of neutron efficiency.

In accordance with one form of the present invention, the coolant is flowed through the nuclear reactor in the described manner; and the thermal energy imparted to the coolant in flowing through the nuclear reactor is utilized by bringing the coolant into countercurrent indirect heat exchange contact with a power generating medium, such as water or water vapor, in order to generate steam. The steam may then be passed through a suitable power generating means, such as a steam turbine, to generate electrical energy.

It will be understood, of course, that the foregoing is exemplary of the many uses to which the thermal energy may be put. It will be further understood that the thermal energy may be simultaneously utilized for a plurality of purposes.

Figure 2:
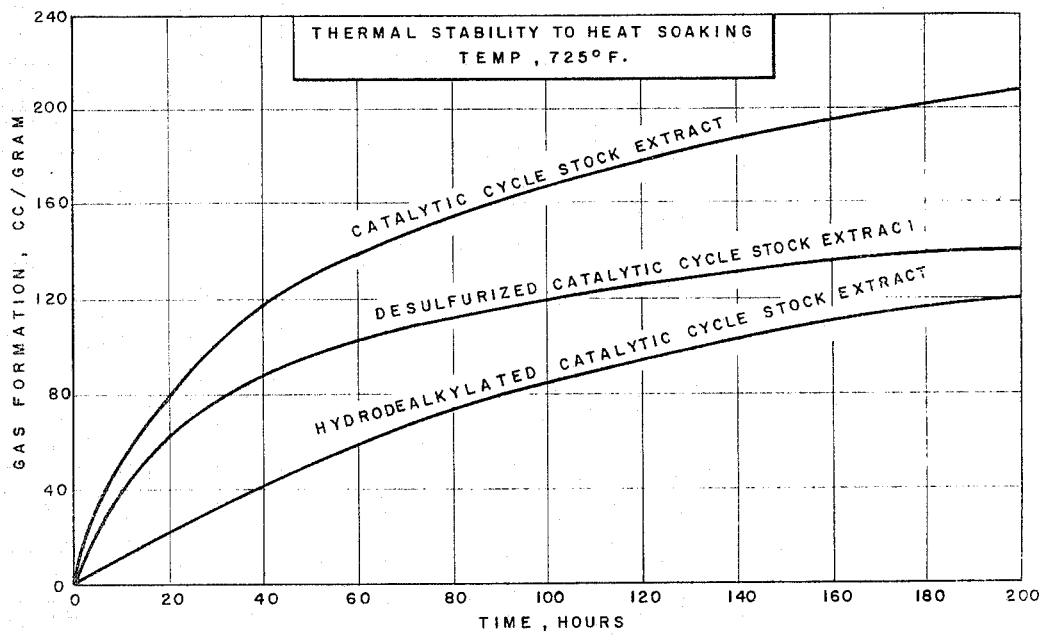

The invention, as well as its many advantages, will be further understood by reference to the following detailed description and drawings in which:

FIG. 1 is a schematic flow diagram illustrating a preferred embodiment of the present invention; and FIG. 2 is a graph showing the better thermal stability of this new coolant and moderator when compared with other organic materials which have been described as coolants and moderators.

Referring to FIG. 1, the hydrocarbon feed is introduced by way of line 10 and admixed with hydrogen introduced by way of line 12. The hydrogen to hydrocarbon feed ratio may vary from 3,000 s.c.f. per barrel of hydrocarbon feed to 12,000 s.c.f. per barrel of hydrocarbon feed. The mixture of hydrocarbon feed and hydrogen is passed directly into a heater 14 and then by way of line 16 into the hydrodealkylation reactor 18.

In the hydrodealkylation zone, the heated mixture from the heater 14 is allowed to rise in temperature spontaneously as a result of the exothermic nature of the reactions to a temperature within the range of 1000° F. to 1500° F. and is passed through the hydrodealkylation zone for a time period between 20 and 120 seconds at a pressure ranging from 400 p.s.i.g. to 1000 p.s.i.g. The effluent from the hydrodealkylation reactor is removed by way of line 20 and passed through a feed product heat exchanger (not shown) and/or through cooler 22 into a fractionating tower 24.

A product stream is removed from the fractionating tower 24 and fed through line 26 to the nuclear reactor 32. This product stream preferably has a boiling point at atmospheric pressure ranging from 650° F. to 1200° F. Tars and other heavy materials may be removed from the fractionating tower 24 by way of line 28. The light products are removed from the fractionating tower 24 by way of line 30.

In accordance with a preferred form of the present invention, the coolant, after passage through the nuclear reactor 32, is charged to a heat exchange means 36 of any suitable construction by way of a charge line 38 controlled by a valve 40. Within the heat exchange means 36 the coolant is brought into indirect countercurrent heat exchange contact with a suitable medium to be heated such as, for example, wet steam which is charged to the heat exchange means 36 by a line 42. The steam may be heated within the heat exchange means 36 and then discharged therefrom by way of a line 44 leading to suitable power generating means 46 such as a turbine for generating electrical energy. A portion of the steam may be withdrawn by way of a branch line 48 controlled by a valve 50 for use as a heating medium.

The organic coolant is flowed from the heat exchanger 36 through line 52 to a tower 54 where the gaseous decomposition products are vented through line 56. The liquid coolant is recycled back to line 26 through line 58.

To prevent buildup of heavy polymeric material, a portion of the recycle stream can be returned to the processing units through line 60 controlled by valve 62.

A phenol extract of catalytic cycle stock was thermally hydrodealkylated employing the following operating conditions:

| | |
|---|---|
| Pressure, p.s.i.g. | 600 |
| Temperature, °F. | 1,037 |
| Cu. ft. $H_2$/bbl. feed | 10,000 |
| Contact time, seconds | 25 |
| Yield, weight percent oil feed | 85 |

Inspections on the feed and product are shown in Table I.

TABLE I

| | Cat. Cycle Stk. Extract | Hydrodealkylated Product |
|---|---|---|
| Sp. gr. 60/60 | 1.094 | 1.129 |
| ASTM Dist., °F. at— | | |
| 5% | 729 | 672 |
| 10% | 747 | 712 |
| 20% | 770 | 744 |
| 30% | 786 | 765 |
| 40% | 801 | 784 |
| 50% | 815 | 799 |
| 60% | 826 | 812 |
| 70% | 841 | 828 |
| 80% | 856 | 847 |
| 90% | 883 | 876 |
| 95% | 918 | 928 |
| FBP | 923 | 947 |
| Percent Rec. | 95.5 | 95.5 |
| S°, wt. percent | 1.25 | 1.43 |
| Anil. Pt. °F. | 90 | 53 |
| R.I. at 67° C. | 1.6498 | 1.6805 |
| Percent Arom. by Silica Gel | 92 | 99 |

The catalytic cycle stock extract feed and the hydrodealkylated product of Table I were analyzed by a nuclear magnetic resonance spectrometer to obtain data on the changes resulting from hydrodealkylation. The results are shown in Table II.

TABLE II.—PERCENT OF TOTAL HYDROGENS

| Hydrogen Types | Feed | Hydrodealkylated Product |
|---|---|---|
| Phenanthrene Angular H's | 5.0 | 6.7 |
| Other Aromatic H's | 29.8 | 41.4 |
| α and β to Arom. Ring, H's | 38.0 | 43.3 |
| Paraffinic $CH_2$ and CH, H's | 19.8 | 7.4 |
| Paraffinic $CH_3$, H's | 7.4 | 1.2 |
| | 100.0 | 100.0 |

It is apparent that thermal hydrodealkylation has essentially no effect on hydrogens attached directly to aromatic ring carbons (except for a concentrating effect), whereas considerable dealkylation of side chains has taken place. As a result, the product has a more aromatic character than the original material.

The catalytic cycle stock and the dealkylated product were tested for thermal stability by heating the materials at 725° F. in a bomb at atmospheric pressure in the absence of air or oxygen and measuring the gas resulting from thermal decomposition. A desulfurized catalytic cycle stock was also included in the comparison. The results are presented in FIG. 2. It is seen that the hydrodealkylated product produces considerably less gas than either the original catalytic cycle stock or the desulfurized catalytic cycle stock. The original catalytic cycle stock and desulfurized catalytic cycle stock used to provide the graph of FIG. 2 are materials known to be useful as organic coolants and moderators. The organic coolant and moderator of this invention has better thermal stability than these other known organic coolants and moderators.

I claim:

1. In the operation of a nuclear reactor, the improvement which comprises cooling said reactor by flowing a mixture of liquid hydrocarbons therethrough, said mixture of liquid hydrocarbons having been prepared by thermal hydrodealkylation of a petroleum feedstock at a temperature ranging from 1000° F. to 1500° F., a hydrogen to liquid hydrocarbon ratio ranging from 3000 s.c.f. per barrel of liquid hydrocarbons to 12,000 s.c.f. per barrel of liquid hydrocarbons, a pressure ranging from 400 p.s.i.g. to 1000 p.s.i.g. and for a period of time ranging from 20 seconds to 120 seconds.

2. In the operation of a nuclear reactor, the improved method for conserving thermal energy generated within the nuclear reactor which comprises: flowing a stream of coolant comprising a mixture of liquid hydrocarbons through said nuclear reactor under conditions to maintain the temperature of said nuclear reactor at a predetermined level and to heat said mixture, said mixture of liquid hydrocarbons having been prepared by thermal hydrodealkylation of a petroleum feedstock at a temperature ranging from 1000° F. to 1500° F., a hydrogen to liquid hydrocarbon ratio ranging from 3000 s.c.f. per barrel of liquid hydrocarbons to 12,000 s.c.f. per barrel of liquid hydrocarbons, a pressure ranging from 400 p.s.i.g. to 1000 p.s.i.g. and for a period of time ranging from 20 seconds to 120 seconds; and utilizing the thermal energy thus imparted to said mixture exteriorly of said nuclear reactor.

3. A method in accordance with claim 2 wherein vaporized water is heated by said mixture and wherein at least a portion of the thermal energy imparted to said heated vaporized water is converted to electrical energy.

4. In the operation of a nuclear reactor, the improvement which comprises cooling said reactor by flowing a mixture of liquid hydrocarbons therethrough, said mixture of liquid hydrocarbons having been prepared by thermal hydrodealkylating a petroleum feedstock, cooling the resulting material, fractionating said material, and obtaining a product having a boiling point ranging from 650° F. to 1200° F.

5. A method in accordance with claim 4 wherein the thermal energy imparted to said mixture is utilized exteriorly of the nuclear reactor.

6. A method in accordance with claim 5 wherein vaporized water is heated by said mixture and wherein at least a portion of the thermal energy imparted to said heated vaporized water is converted to electrical energy.

References Cited by the Examiner

UNITED STATES PATENTS

| | | | |
|---|---|---|---|
| 3,062,728 | 11/1962 | Duffy | 176—50 X |
| 3,178,357 | 4/1965 | Black et al. | 176—50 |

REUBEN EPSTEIN, *Primary Examiner.*